US010746028B2

(12) United States Patent
Kim

(10) Patent No.: US 10,746,028 B2

(45) Date of Patent: Aug. 18, 2020

(54) SYSTEM FOR COOLING GAS TURBINE

(71) Applicant: DOOSAN HEAVY INDUSTRIES CONSTRUCTION CO., LTD., Gyeongsangnam-do (KR)

(72) Inventor: Kyung Kook Kim, Daejeon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 637 days.

(21) Appl. No.: 15/274,537

(22) Filed: Sep. 23, 2016

(65) Prior Publication Data

US 2017/0081962 A1 Mar. 23, 2017

(30) Foreign Application Priority Data

Sep. 23, 2015 (KR) ........................ 10-2015-0134830

(51) Int. Cl.

| | |
|---|---|
| ***F01D 5/18*** | (2006.01) |
| ***F01D 5/08*** | (2006.01) |
| ***F02C 3/04*** | (2006.01) |
| ***F02C 7/18*** | (2006.01) |
| ***F02C 6/08*** | (2006.01) |
| ***F01D 5/06*** | (2006.01) |

(52) U.S. Cl.

CPC ............. *F01D 5/187* (2013.01); *F01D 5/081* (2013.01); *F01D 5/084* (2013.01); *F02C 3/04* (2013.01); *F02C 7/18* (2013.01); *F01D 5/066* (2013.01); *F02C 6/08* (2013.01); *F05D 2260/232* (2013.01)

(58) Field of Classification Search

CPC . F01D 5/187; F01D 5/06; F01D 5/066; F01D 5/081; F01D 5/082; F01D 5/084; F01D 5/085; F01D 5/087; F01D 25/12; F05D 2260/232; F05D 2260/20; F02C 6/08; F02C 7/16; F02C 7/18

USPC .............. 415/180; 416/198 A, 200 A, 201 R

See application file for complete search history.

(56) References Cited

U.S. PATENT DOCUMENTS

| | | | | |
|---|---|---|---|---|
| 7,017,349 B2 * | 3/2006 | Laurello | ................. | F01D 5/081 60/782 |
| 7,585,148 B2 * | 9/2009 | Hoell | ...................... | F01D 5/026 415/115 |
| 2011/0280735 A1 | 11/2011 | Dakowski et al. | | |
| 2012/0060507 A1 * | 3/2012 | King | ...................... | F01D 5/081 60/782 |
| 2014/0056686 A1 | 2/2014 | Zhang et al. | | |

FOREIGN PATENT DOCUMENTS

| | | |
|---|---|---|
| EP | 0414028 | 2/1991 |

OTHER PUBLICATIONS

An extended European search report issued by the European Patent Office dated Feb. 17, 2017 in connection with European Patent Application No. 16190369.5.

* cited by examiner

*Primary Examiner* — Woody A Lee, Jr.

*Assistant Examiner* — Andrew Thanh Bui

(74) *Attorney, Agent, or Firm* — Invenstone Patent, LLC

(57) ABSTRACT

Disclosed herein is a system for cooling a gas turbine. The system for cooling a gas turbine cools a turbine disk unit by individually supplying cooling air to each of a plurality of turbine disks.

13 Claims, 3 Drawing Sheets

SYSTEM FOR COOLING GAS TURBINE

CROSS-REFERENCE TO RELATED APPLICATIONS

This application claims priority to Korean Patent Application No. 10-2015-0134830, filed on Sep. 23, 2015, the disclosure of which is incorporated herein by reference in its entirety.

BACKGROUND

Exemplary embodiments of the present disclosure relate to a gas turbine, and more particularly, to a system for cooling a gas turbine, which is capable of improving the efficiency of a gas turbine by individually supplying cooling air to each of a plurality of turbine disks included in a turbine disk unit so as to stably cool these expensive turbine disks.

In general, a gas turbine is a type of motor which jets combustion gas toward blades of a turbine to obtain torque, and may be largely configured of a compressor, a combustor, and a turbine. The compressor serves to compress air, which is introduced thereinto, to a high pressure by receiving a portion of power generated by the rotation of the turbine, and the compressed air is transferred to the combustor.

The combustor mixes and burns compressed air and fuel to generate the flow of high-temperature combustion gas, and then jets the combustion gas to the turbine, so that the turbine is rotated by the jetted combustion gas so as to obtain torque.

Here, each of the compressor and the turbine includes a plurality of turbine disks, each of which has blades radially coupled to the outer peripheral portion thereof. The compressor typically includes more turbine disks than that of the turbine. Hereinafter, a plurality of turbine disks arranged to the compressor is referred to as a “compressor section” and a plurality of turbine disks arranged to the turbine is referred to as a “turbine section”.

The individual turbine disks are fixed using a tie rod.

The tie rod is inserted to penetrate centers of the respective turbine disks, and the turbine disks may be fastened to each other by pressure nuts, which are coupled to both ends of the tie rod, so as not to be axially moved.

Meanwhile, since the combustor is arranged between the compressor section and the turbine section, the compressor section and the turbine section are spaced apart from each other such that a space for arrangement of the combustor is defined therebetween. Accordingly, the gas turbine additionally includes a torque transfer member which may transfer rotational torque generated by the turbine section to the compressor section.

BRIEF SUMMARY

An object of the present disclosure is to provide a system for cooling a gas turbine, which is capable of cooling a turbine disk unit by individually supplying cooling air to each of a plurality of turbine disks included in the turbine disk unit.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the system as claimed and combinations thereof.

In accordance with a first aspect of the present embodiment, there is provided a system for cooling a gas turbine including a first cooling air supply passage provided in a gas turbine, the first cooling air supply passage being open such that cooling air is supplied from a compressor through a combustor and a torque tube unit to a first stage turbine disk of a turbine disk unit, a second cooling air supply passage that is open such that cooling air is supplied from an nth unit compressor disk of first to nth unit compressor disks, constituting a compressor disk unit, through the torque tube unit to a second stage turbine disk of the turbine disk unit, and a third cooling air supply passage that is open such that cooling air is supplied from the n-αth unit compressor disk of the first to nth unit compressor disks, after axially passing through a tie rod provided in the gas turbine, to third and fourth stage turbine disks of the turbine disk unit.

The cooling air supplied through the first and second cooling air supply passages may have a pressure and a temperature that are relatively higher than the cooling air supplied through the third cooling air supply passage.

The nth unit compressor disk may be a final unit compressor disk, which is proximate to the torque tube unit, among the first to nth unit compressor disks arranged toward the torque tube unit, and the n-αth unit compressor disk may be a unit compressor disk that is located at a αth position from the nth unit compressor disk in a direction toward the first unit compressor disk.

The first cooling air supply passage may have a path that is obliquely open toward the torque tube unit from a rear end of the combustor, which is proximate to the first stage turbine disk, and then extends toward the first stage turbine disk.

The compressor disk unit may further include first swirl chambers formed beneath the first to nth unit compressor disks in order to change a flow of cooling air to a turbulent flow before the cooling air is supplied to the torque tube unit after flowing into the compressor disk unit.

The cooling air may flow along the first cooling air supply passage, in a state in which a flow of the cooling air is changed to a turbulent flow while the cooling air sequentially passes through the combustor and second swirl chambers formed in the torque tube unit, and may be supplied to the first stage turbine disk through first swirl chambers formed in the compressor disk unit before the cooling air is supplied to the first stage turbine disk.

The compressor disk unit may further include compressor cooling air supply passages connecting the first and second swirl chambers, the compressor cooling air supply passages being formed to move the cooling air therethrough.

The cooling air may be supplied to the first stage turbine disk through the first cooling air supply passage at a relatively higher pressure than that in the first stage turbine disk.

The torque tube unit may include first to nth unit torque tube units arranged in close contact with each other between the compressor disk unit and the turbine disk unit, and the first to nth unit torque tube units may be formed with torque tube cooling passages communicating with the first or second cooling air supply passage, the torque tube cooling passages being open for movement of the cooling air.

The torque tube unit may further include chambers that are empty spaces defined by front and rear surfaces of the adjacent unit torque tube units in the state in which the first to nth unit torque tube units are in close contact with each other.

The torque tube cooling passages may extend toward the compressor disk unit through a region in which the chambers are not formed.

The third cooling air supply passage may include an extension passage that obliquely extends toward the tie rod, inserted into a center of the gas turbine, from the compressor disk unit, and then extends toward the turbine disk unit along an outer peripheral surface of the tie rod.

The third cooling air supply passage may further include a first branch passage that is independently branched to the third stage turbine disk from the extension passage, and a second branch passage that is independently branched to the fourth stage turbine disk from the extension passage.

The turbine disk unit may further include third swirl chambers formed to change a flow of cooling air to a turbulent flow.

In accordance with a second aspect of the present disclosure, there is provided a system for cooling a gas turbine including a first cooling air supply passage provided in a gas turbine, the first cooling air supply passage being open such that cooling air is supplied from a compressor through a combustor and torque tube cooling passages formed in a torque tube unit to a first stage turbine disk of a turbine disk unit, a second cooling air supply passage that is open such that cooling air is supplied from an n-αth unit compressor disk of first to nth unit compressor disks, constituting a compressor disk unit, through the torque tube cooling passages to a second stage turbine disk of the turbine disk unit, and a third cooling air supply passage that is open such that cooling air is supplied from the n-αth unit compressor disk of the first to nth unit compressor disks, after axially passing through a tie rod provided in the gas turbine, to third and fourth stage turbine disks of the turbine disk unit.

The cooling air may be introduced into the second cooling air supply passage through the tenth unit compressor disk, and the cooling air may be introduced into the third cooling air supply passage through the ninth unit compressor disk.

The nth unit compressor disk may be a final unit compressor disk, which is proximate to the torque tube unit, among the first to nth unit compressor disks arranged toward the torque tube unit, and the n-αth unit compressor disk may be a unit compressor disk that is located at a αth position from the nth unit compressor disk in a direction toward the first unit compressor disk.

The compressor disk unit may further include first swirl chambers formed beneath the first to nth unit compressor disks in order to change a flow of cooling air to a turbulent flow before the cooling air is supplied to the torque tube unit, the first swirl chambers being spaced apart from each other, and compressor cooling air supply passages connecting the first swirl chambers spaced apart from each other.

The third cooling air supply passage may include an extension passage that obliquely extends toward the tie rod, inserted into a center of the gas turbine, from the compressor disk unit, and then extends toward the turbine disk unit along an outer peripheral surface of the tie rod.

In accordance with a third aspect of the present disclosure, there is provided a system for cooling a gas turbine including a first cooling air supply passage provided in a gas turbine, the first cooling air supply passage being open such that cooling air is supplied from a compressor through a combustor and torque tube cooling passages formed in a torque tube unit to a first stage turbine disk of a turbine disk unit, a second cooling air supply passage that is open such that cooling air is supplied from an n-αth unit compressor disk of first to nth unit compressor disks, constituting a compressor disk unit, through the torque tube cooling passages to second and third stage turbine disks of the turbine disk unit, and a third cooling air supply passage that is open such that cooling air is supplied from the n-αth unit compressor disk of the first to nth unit compressor disks, after axially passing through a tie rod provided in the gas turbine, to a fourth stage turbine disk of the turbine disk unit.

The nth unit compressor disk may be a final unit compressor disk, which is proximate to the torque tube unit, among the first to nth unit compressor disks arranged toward the torque tube unit, and the n-αth unit compressor disk may be a unit compressor disk that is located at a αth position from the nth unit compressor disk in a direction toward the first unit compressor disk.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
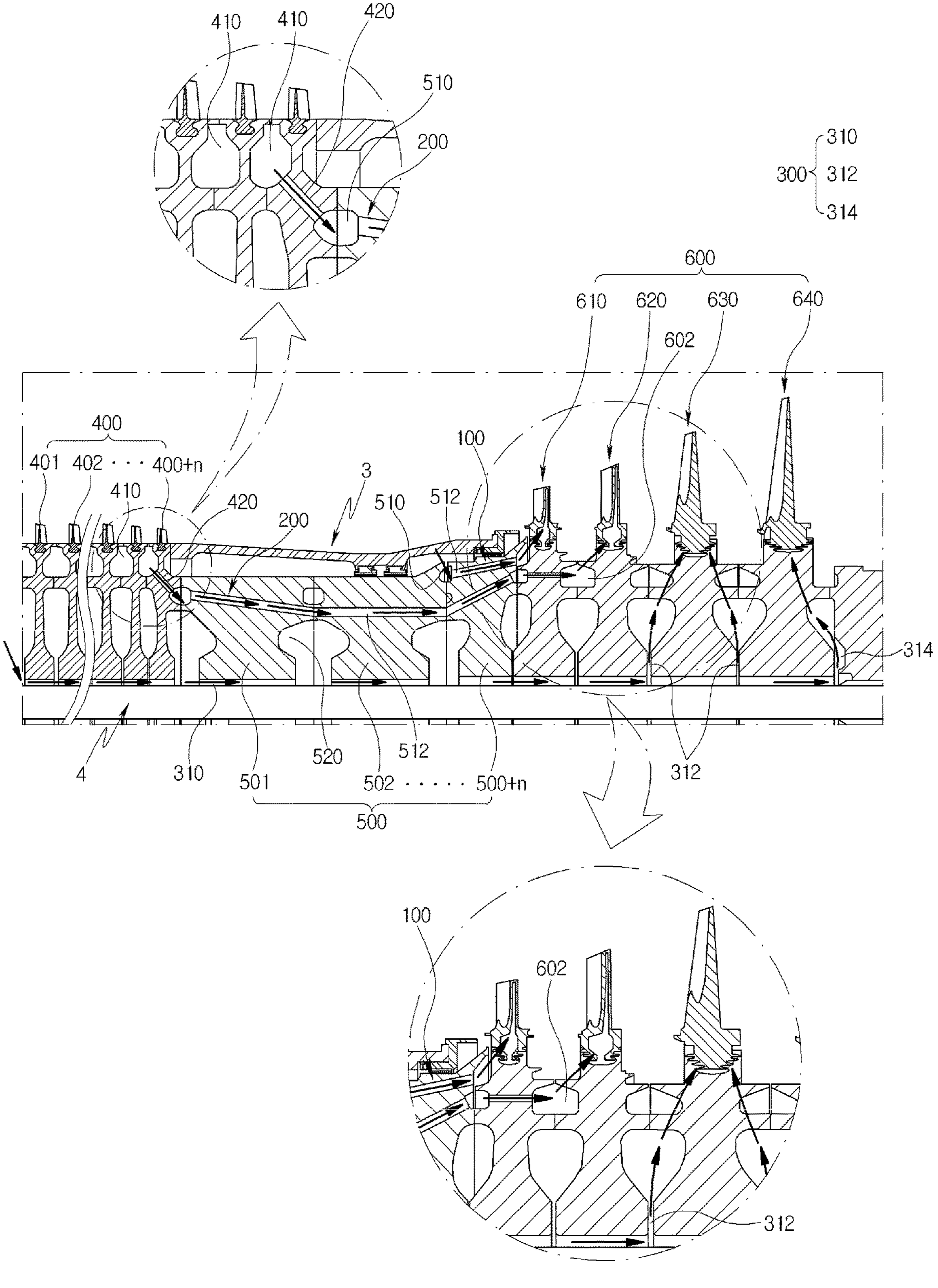
FIG. 1 is a longitudinal cross-sectional view illustrating a system for cooling a gas turbine according to a first embodiment of the present disclosure.

A system for cooling a gas turbine according to exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Referring to FIG. 1, a system for cooling a gas turbine according to a first embodiment of the present disclosure aims to improve the durability of a turbine disk unit 600, which is exposed to a high-temperature operating environment, and to prevent a gas turbine from stopping due to deformation or damage that may be caused when it is exposed to a high-temperature condition, by cooling first to nth stage turbine disks included in the turbine disk unit 600.

To this end, the system of the present disclosure includes first to third cooling air supply passages 100, 200, and 300, and mainly cools the turbine disk unit 600 while accessorily cooling a torque tube unit 500 and a compressor disk unit 400. In addition, the system may simultaneously cool the turbine disk unit 600 and components adjacent thereto, and it is thus possible to improve cooling efficiency and minimize thermal deformation of and damage to these expensive components.

The first cooling air supply passage 100 is open through the torque tube unit 500 and the turbine disk unit 600 such that cooling air is supplied from a compressor through a combustor 3 and the torque tube unit 500 to the first stage turbine disk 610 of the turbine disk unit 600. For example, the first cooling air supply passage 100 is obliquely open toward the torque tube unit 500 from the rear end of the combustor 3, which is proximate to the first stage turbine disk 610, and is open while having a path that extends toward the first stage turbine disk 610.

When the first cooling air supply passage 100 extends by a minimum distance, the pressure and temperature of the cooling air supplied to the first stage turbine disk 610 may be stably maintained in an initial state without the reduction thereof. Therefore, it is possible to improve the cooling efficiency of the first stage turbine disk 610.

The first cooling air supply passage 100 is open in the state in which it is inclined downward toward the torque tube unit 500 from the outside of the combustor 3. Cooling air is supplied through the first cooling air supply passage 100 under high-temperature and high-pressure conditions.

For example, since a region where the first stage turbine disk 610 is positioned is maintained at a high temperature of about 1500° C. and at a high pressure, the pressure of the cooling air supplied through the first cooling air supply passage 100 is relatively higher than the pressure in the region where the first stage turbine disk 610 is positioned.

Through such a structure, it is possible to prevent cooling air from flowing backward toward the combustor 3 instead of the first stage turbine disk 610 when the pressure of the cooling air supplied through the first cooling air supply passage 100 is lower than the pressure in the region where the first stage turbine disk 610 is positioned.

Accordingly, it is possible to stably cool the first stage turbine disk 610, thereby improving cooling efficiency, and to minimize damage to and deformation of the first stage turbine disk 610.

The first cooling air supply passage 100 extends through the torque tube unit 500, and the torque tube unit 500 includes first to nth unit torque tube units 501 to 500+n. The first cooling air supply passage 100 is formed in the nth unit torque tube unit 500+n or the n-αth unit torque tube unit adjacent to the nth unit torque tube unit 500+n.

In the torque tube unit 500 according to the embodiment, the second to nth unit torque tube units 502 to 500+n are sequentially in close contact with each other from the first unit torque tube unit 501 which is in close contact with the compressor disk unit 400, and the number of first to nth unit torque tube unit 501 to 500+n, which are arranged between the compressor disk unit 400 and the turbine disk unit 600, may increase depending on the size of the gas turbine.

Among the first to nth unit torque tube units constituting the torque tube unit 500, the nth unit torque tube unit is a final unit torque tube unit which is proximate to the turbine disk unit 600, and the n-αth unit torque tube unit is a unit torque tube unit which is located at a αth position from the nth unit torque tube unit in the direction toward the first unit torque tube unit 501.

The first cooling air supply passage 100 is open to have a predetermined diameter. However, the first cooling air supply passage 100 is not limited to having a specific diameter, as long as it can be formed so as to provide a sufficient flow rate in order to stably cool the first stage turbine disk 610 which is an object to be cooled.

Cooling air is supplied to the first stage turbine disk 610 in the state in which the flow of the cooling air is changed to a turbulent flow once again while the cooling air sequentially passes through the combustor 3 and second swirl chambers 510.

The second cooling air supply passage 200 is open such that cooling air is supplied from an nth unit compressor disk 401 of first to nth unit compressor disks 401 to 400+n, which constitute the compressor disk unit 400, through the torque tube unit 500 to the second stage turbine disk 620 of the turbine disk unit 600.

The second cooling air supply passage 200 serves to mainly cool the second stage turbine disk 620. However, in the entire layout of the second cooling air supply passage 200, the second cooling air supply passage 200 has a movement path in which cooling air passes through the specific positions of the compressor disk unit 400, the torque tube unit 500, and the turbine disk unit 600.

That is, cooling air may also cool portions corresponding to the above respective positions while flowing through the second cooling air supply passage 200. In addition, it is possible to cool a peripheral portion corresponding to the movement path while cooling the second stage turbine disk 620, thereby improving cooling efficiency, and to simultaneously perform the auxiliary cooling of the compressor disk unit 400 and the torque tube unit 500.

For reference, the second cooling air supply passage 200 is supplied with cooling air from the thirteenth stage turbine disk.

The compressor disk unit 400 has first swirl chambers 410 which are formed beneath the first to nth unit compressor disks 401 to 400+n in order to change the flow of cooling air to a turbulent flow before the cooling air is supplied to the torque tube unit 500 after flowing into the compressor disk unit 400.

The first swirl chambers 410 are empty spaces formed in the compressor disk unit, which is adjacent to the compressor disks, in the longitudinal cross-sectional view illustrating the first to nth unit compressor disks 401 to 400+n, and each is not limited to having a specific size.

The first swirl chambers 410 serve to initially change the flow of cooling air to a turbulent flow when the cooling air flows along the second cooling air supply passage 200. Therefore, it is possible to minimize a phenomenon in which the flow of cooling air is concentrated only on a specific region. In addition, since the first swirl chambers 410 provide movement capability that enables cooling air to move throughout the second cooling air supply passage 200, it is possible to increase the cooling efficiency of the second stage turbine disk 620.

Thus, it is possible to improve the cooling efficiency of the second stage turbine disk 620 which is exposed to a high-temperature condition for a long time.

The turbine disk unit 600 further includes third swirl chambers 602 in order to change the flow of cooling air to a turbulent flow. The third swirl chambers 602 are spaces formed in the compressor disk unit, which is adjacent to the second or fourth stage turbine disk 620 or 640, so as to diffuse the flow of cooling air, and may thus improve cooling efficiency.

Unlike the first cooling air supply passage 100, cooling air is introduced into the second cooling air supply passage 200 from the nth unit compressor disk 400+n, and is then supplied to the second stage turbine disk 620 along the path illustrated in the drawing.

The compressor disk unit 400 has compressor cooling air supply passages 420, which connect the first and second swirl chambers 410 and 510 and are formed to move cooling air. Cooling air moves toward the torque tube unit 500 through the compressor cooling air supply passages 420.

The second cooling air supply passage 200 formed in the torque tube unit 500 has one of a rectilinear shape and a shape that is inclined at a specific angle, for easy processing. For example, since the first to nth unit torque tube units 501 to 500+n are independently manufactured as individual units, the second cooling air supply passage 200 is formed in the first to nth unit torque tube units 501 to 500+n by drilling so as to have a rectilinear shape or a shape that is inclined at a specific angle.

Torque tube cooling passages 512 are formed in the first to nth unit torque tube units 501 to 500+n. The torque tube cooling passages 512 communicate with the first or second cooling air supply passage 100 or 200 and are open for the movement of cooling air.

Accordingly, the cooling air introduced through the first and second cooling air supply passages 100 and 200 flows along the torque tube cooling passages 512.

The torque tube unit 500 further includes chambers 520 which are empty spaces defined by the front and rear surfaces of the adjacent unit torque tube units in the state in which the first to nth unit torque tube units 501 to 500+n are in close contact with each other. Each of the chambers 520 has a shape illustrated in the drawing or another shape.

When the chamber 520 has an excessively large area, an area for transfer of high-temperature heat may be reduced. On the contrary, when the chamber 520 has a small area, problems due to an increase in weight may occur. Therefore, the chamber is preferably formed to have the shape and size illustrated in the drawing.

Since the torque tube cooling passages 512 extend toward the compressor disk unit 400 through a region in which the chambers 520 are not formed, the torque tube cooling passages 512 are arranged as individual movement paths without overlapping or communication. Accordingly, since cooling air may flow through the first or second cooling air supply passage 100 or 200, the cooling air stably moves to the first and second stage turbine disks 610 and 620.

The torque tube cooling passages 512 preferably extend toward the compressor disk unit 400 through the region in which the chambers 520 are not formed. Through such a structure, it is possible to prevent the flow of cooling air from being changed or delayed due to the expanded area of each of the chambers 520.

However, when the area of each chamber 520 is changed to a relatively small size, the torque tube cooling passages 512 may also be formed to have a path that passes through the chamber 520. In this case, if please inform us of passing through which one of the chambers 520, we will reflect it.

The third cooling air supply passage 300 is open such that cooling air is supplied from the n-αth unit compressor disk of the first to nth unit compressor disks 401 to 400+n, after axially passing through a tie rod 4 provided in the gas turbine, to the third and fourth stage turbine disks 630 and 640 of the turbine disk unit 600.

The nth unit compressor disk is a final unit compressor disk which is proximate to the torque tube unit 500, among the first to nth unit compressor disks arranged toward the torque tube unit 500. The n-αth unit compressor disk is a unit compressor disk which is located at a αth position from the nth unit compressor disk in the direction toward the first unit compressor disk 401.

For example, in the case where first to fourteenth unit compressor disks are included in the compressor disk unit 400, when the term "n" is 14 and the term "a" is 5, the n-αth unit compressor disk is a ninth unit compressor disk since the term "n" corresponds to 14 and the term "a" corresponds to 5.

In addition, since the terms "n" and "a" in second and third embodiments mean specific positions (stages) as described above, a detailed description thereof will be omitted later.

The third cooling air supply passage 300 further includes an extension passage 310, which obliquely extends toward the tie rod 4, inserted into the center of the gas turbine, from the compressor disk unit 400, and then extends toward the turbine disk unit 600 along the outer peripheral surface of the tie rod 4. The extension passage 310 rectilinearly extends toward the turbine disk unit 600 in the axial direction of the tie rod 4.

Accordingly, cooling air is not supplied from a position adjacent to the nth unit compressor disk 400+n, but is supplied from the n-αth unit compressor disk. This is because a region where the third and fourth stage turbine disks 630 and 640 are positioned is maintained at a temperature and a pressure which are relatively lower, compared to the first stage turbine disk 610. Therefore, even when the temperature and pressure of the cooling air supplied to the third and fourth stage turbine disks 630 and 640 are relatively lower than those of the cooling air supplied to the first stage turbine disk 610, the third and fourth stage turbine disks 630 and 640 can be stably cooled.

By way of example, since cooling air is supplied to the third cooling air supply passage 300 from the eighth unit compressor disks and the extension passage 310 extends rectilinearly, the third cooling air supply passage 300 may have a simple passage structure, compared to the first and second cooling air supply passages 100 and 200.

Accordingly, cooling air may be stably supplied to the third and fourth stage turbine disks 630 and 640 through the third cooling air supply passage 300 and perform efficient cooling, thereby improving the efficiency of the gas turbine. In addition, it is possible to reduce damage due to ruptures or cracks caused at high temperature by improving the cooling efficiency of the third and fourth stage turbine disks 630 and 640.

A portion of cooling air may be supplied to the above-mentioned chambers 520 through the extension passage 310. Therefore, it is possible to cool the torque tube unit 500 together. When the extension passage 310 extends for supplying cooling air to the third and fourth stage turbine disks 630 and 640, it is possible to cool the turbine disk unit 600 together.

The third cooling air supply passage 300 includes a first branch passage 312 which is independently branched to the third stage turbine disk 630 from the extension passage 310, and a second branch passage 314 which is independently branched to the fourth stage turbine disk 640 from the extension passage 310.

The first branch passage 312 is divided into a plurality of passages and extends to the third stage turbine disk 630 from the extension passage 310 in order to cool the third stage turbine disk 630. Since the third stage turbine disk 630 is exposed to a high-temperature environment, a relatively large amount of cooling air is supplied to the third stage turbine disk 630, compared to the cooling air supplied to the fourth stage turbine disk 640.

The second branch passage 314 is configured of a single passage since the peripheral temperature thereof is lower compared to the third stage turbine disk 630. However, the second branch passage 314 may also be open to have a different diameter in order to obtain the stable flow rate of the cooling air supplied thereto.

The pressure and temperature of the cooling air supplied through the first and second cooling air supply passages 100 and 200 are relatively higher than those of the cooling air supplied through the third cooling air supply passage 300. Cooling air is supplied under the above condition for optimal cooling depending on the position of the turbine disk since the pressure and temperature in the region where the first and second stage turbine disks 610 and 620 are positioned are relatively higher than the pressure and temperature in the region where the third stage turbine disk 630 is positioned.

A system for cooling a gas turbine according to a second embodiment of the present disclosure will be described with reference to the drawing.

Figure 2:
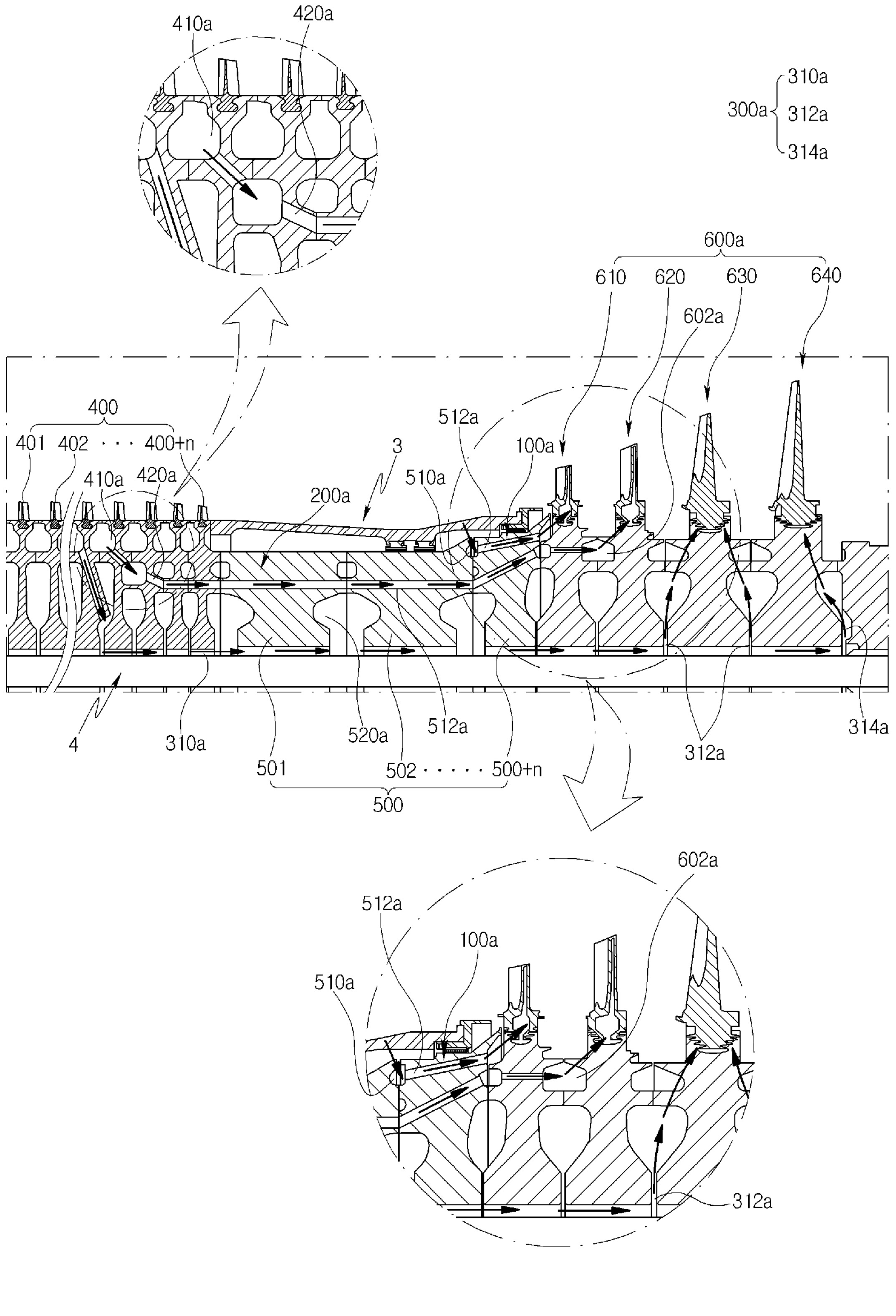
FIG. 2 is a longitudinal cross-sectional view illustrating a system for cooling a gas turbine according to a second embodiment of the present disclosure.

Referring to FIG. 2, the system for cooling a gas turbine according to the second embodiment of the present disclosure differs from the first embodiment in that the introduction positions of cooling air are different. That is, a first cooling air supply passage 100*a* is identical to that of the first embodiment, a second cooling air supply passage 200*a* is supplied with cooling air from a tenth unit compressor disk, and a third cooling air supply passage 300*a* is supplied with cooling air from a ninth unit compressor disk.

To this end, the system for cooling a gas turbine according to the embodiment includes a first cooling air supply passage 100*a* which is provided in a gas turbine and is open such that cooling air is supplied from a compressor through torque tube cooling passages 512*a* formed in a torque tube unit 500*a* to a first stage turbine disk 610 of a turbine disk unit 600*a*, a second cooling air supply passage 200*a* which is open such that cooling air is supplied from an n-αth unit compressor disk of first to nth unit compressor disks 401 to 400+n, which constitute a compressor disk unit 400*a*, through the torque tube cooling passages 512*a* to a second stage turbine disk 620 of the turbine disk unit 600*a*, and a third cooling air supply passage 300*a* which is open such that cooling air is supplied from the n-αth unit compressor disk of the first to nth unit compressor disks 401 to 400+n, after axially passing through a tie rod 4 provided in the gas turbine, to third and fourth stage turbine disks 630 and 640 of the turbine disk unit 600*a*.

The first cooling air supply passage 100*a* according to the embodiment is open such that the cooling air supplied from the compressor is supplied to the first stage turbine disk 610 of the turbine disk unit 600*a* through a combustor 3 and the torque tube unit 500*a*.

In addition, the first cooling air supply passage 100*a* has a path that is obliquely open toward the torque tube unit 500*a* from the rear end of the combustor 3, which is proximate to the first stage turbine disk 610, and then extends toward the first stage turbine disk 610.

When the first cooling air supply passage 100*a* extends by a minimum distance, the pressure and temperature of the cooling air supplied to the first stage turbine disk 610 may be stably maintained in an initial state without the reduction thereof. Therefore, it is possible to improve the cooling efficiency of the first stage turbine disk 610.

The first cooling air supply passage 100*a* is open in the state in which it is inclined downward toward the torque tube unit 500*a* from the outside of the combustor 3. Cooling air is supplied through the first cooling air supply passage 100*a* under high-temperature and high-pressure conditions.

Since a region where the first stage turbine disk 610 is positioned is maintained at a high temperature of about 1500° C. and at a high pressure, the pressure of the cooling air supplied through the first cooling air supply passage 100*a* is relatively higher than the pressure in the region where the first stage turbine disk 610 is positioned.

Through such a structure, it is possible to prevent cooling air from flowing backward toward the combustor 3 instead of the first stage turbine disk 610 when the pressure of the cooling air supplied through the first cooling air supply passage 100*a* is lower than the pressure in the region where the first stage turbine disk 610 is positioned.

Accordingly, it is possible to stably cool the first stage turbine disk 610, thereby improving cooling efficiency, and to minimize damage to and deformation of the first stage turbine disk 610.

The first cooling air supply passage 100*a* extends through the torque tube unit 500*a*, and the torque tube unit 500*a* includes first to nth unit torque tube units 501 to 500+n. The first cooling air supply passage 100*a* is formed in the n-αth unit torque tube unit.

Cooling air is supplied to the first stage turbine disk 610 in the state in which the flow of the cooling air is changed to a turbulent flow once again while the cooling air sequentially passes through the combustor 3 and second swirl chambers 510*a*.

Cooling air is introduced into the second cooling air supply passage 200*a* through the tenth unit compressor disk, and cooling air is introduced into the third cooling air supply passage 300*a* through the ninth unit compressor disk. Here, cooling air is supplied to the second cooling air supply passage 200*a* through the tenth unit compressor disk in order to supply a fluid for cooling from the position corresponding to above stage (unit) depending on the layout of the gas turbine or the temperature and pressure of cooling air.

The second embodiments differs from the first embodiment in that the second cooling air supply passage 200*a* extends in a rectilinear form from the torque tube unit 500*a*. In this case, it is possible to improve the flow rate of cooling air for cooling and reduce the resistance of cooling air.

The second cooling air supply passage 200*a* is open such that cooling air is supplied from the tenth unit compressor disk of the first to nth unit compressor disks 401 to 400+n, which constitute the compressor disk unit 400*a*, through the torque tube unit 500*a* to the second stage turbine disk 620 of the turbine disk unit 600*a*.

The second cooling air supply passage 200*a* serves to mainly cool the second stage turbine disk 620. However, the entire layout of the second cooling air supply passage 200*a* is configured as follows.

For example, the second cooling air supply passage 200*a* has a movement path in which cooling air passes through the specific positions of the compressor disk unit 400*a*, the torque tube unit 500*a*, and the turbine disk unit 600*a*. Therefore, it is possible to cool a peripheral portion corresponding to the movement path while cooling the second stage turbine disk 620, thereby improving cooling efficiency, and to simultaneously perform the auxiliary cooling of the compressor disk unit 400*a* and the torque tube unit 500*a*.

The compressor disk unit 400*a* has first swirl chambers 410*a* which are formed beneath the first to nth unit compressor disks 401 to 400+n in order to change the flow of cooling air to a turbulent flow before the cooling air is supplied to the torque tube unit 500*a* after flowing into the compressor disk unit 400*a*.

The first swirl chambers 410*a* are empty spaces formed in the compressor disk unit in the longitudinal cross-sectional view illustrating the first to nth unit compressor disks 401 to 400+n, and each is not limited to having a specific size.

The first swirl chambers 410*a* serve to initially change the flow of cooling air to a turbulent flow when the cooling air flows along the second cooling air supply passage 200*a*. Therefore, it is possible to minimize a phenomenon in which the flow of cooling air is concentrated only on a specific region. In addition, since the first swirl chambers 410*a* provide movement capability that enables cooling air to move throughout the second cooling air supply passage 200*a*, it is possible to increase the cooling efficiency of the second stage turbine disk 620 which is a cooling object to be cooled.

Thus, it is possible to improve the cooling efficiency of the second stage turbine disk 620 which is exposed to a high-temperature condition for a long time.

The turbine disk unit 600*a* further includes third swirl chambers 602*a* in order to change the flow of cooling air to a turbulent flow. When cooling air is supplied to the second or fourth stage turbine disk 620 or 640, the third swirl chambers 602*a* serve to diffuse the flow of cooling air and may thus improve cooling efficiency.

The compressor disk unit 400*a* has compressor cooling air supply passages 420*a*, which connect the first and second swirl chambers 410*a* and 510*a* and are formed to move cooling air. Cooling air moves toward the torque tube unit 500*a* through the compressor cooling air supply passages 420*a*.

The torque tube unit 500*a* further includes chambers 520*a* which are empty spaces defined by the front and rear surfaces of the adjacent unit torque tube units in the state in which the first to nth unit torque tube units 501 to 500+n are in close contact with each other. Each of the chambers 520*a* has a shape illustrated in the drawing or another shape.

When the chamber 520*a* has an excessively large area, an area for transfer of high-temperature heat may be reduced. On the contrary, when the chamber 520*a* has a small area, problems due to an increase in weight may occur. Therefore, the chamber is preferably formed to have the shape and size illustrated in the drawing.

Since the torque tube cooling passages 512*a* extend toward the compressor disk unit 400*a* through a region in which the chambers 520*a* are not formed, the torque tube cooling passages 512*a* are arranged as individual movement paths without overlapping or communication. Accordingly, since cooling air may flow through the first or second cooling air supply passage 100*a* or 200*a*, the cooling air stably moves to the first and second stage turbine disks 610 and 620.

The third cooling air supply passage 300*a* is open such that cooling air is supplied to the third and fourth stage turbine disks 630 and 640 of the turbine disk unit 600*a* after axially passing through a tie rod 4 provided in the gas turbine.

The third cooling air supply passage 300*a* further includes an extension passage 310*a*, which obliquely extends toward the tie rod 4, inserted into the center of the gas turbine, from the compressor disk unit 400*a*, and then extends toward the turbine disk unit 600*a* along the outer peripheral surface of the tie rod 4. The extension passage 310*a* rectilinearly extends toward the turbine disk unit 600*a* in the axial direction of the tie rod 4.

The third cooling air supply passage 300*a* has a path that extends along the tie rod 4 in order to supply cooling air to the third and fourth stage turbine disks 630 and 640.

Accordingly, cooling air is not supplied from a position adjacent to the nth unit compressor disk 400+n, but is supplied from the n-αth unit compressor disk.

The reason is as follows.

That is, a region where the third and fourth stage turbine disks 630 and 640 are positioned is maintained at a temperature and a pressure which are relatively lower, compared to the first stage turbine disk 610. Therefore, even when the temperature and pressure of the cooling air supplied to the third and fourth stage turbine disks 630 and 640 are relatively lower than those of the cooling air supplied to the first stage turbine disk 610, the third and fourth stage turbine disks 630 and 640 can be stably cooled.

By way of example, since cooling air is supplied to the third cooling air supply passage 300*a* from the ninth unit compressor disks and the extension passage 310*a* extends rectilinearly, the third cooling air supply passage 300*a* may have a simple passage structure, compared to the first and second cooling air supply passages 100*a* and 200*a*.

Accordingly, cooling air may be stably supplied to the third and fourth stage turbine disks 630 and 640 through the third cooling air supply passage 300*a* and perform efficient cooling, thereby improving the efficiency of the gas turbine. In addition, it is possible to reduce damage due to ruptures or cracks caused at high temperature by improving the cooling efficiency of the third and fourth stage turbine disks 630 and 640.

The third cooling air supply passage 300*a* includes a first branch passage 312*a* which is independently branched to the third stage turbine disk 630 from the extension passage 310*a*, and a second branch passage 314*a* which is independently branched to the fourth stage turbine disk 640 from the extension passage 310*a*.

The first branch passage 312*a* is divided into a plurality of passages and extends to the third stage turbine disk 630 from the extension passage 310*a* in order to cool the third stage turbine disk 630. The second branch passage 314*a* is configured of a single passage since the peripheral temperature thereof is lower compared to the third stage turbine disk 630. However, the second branch passage 314*a* may also be open to have a different diameter in order to obtain the stable flow rate of the cooling air supplied thereto.

A system for cooling a gas turbine according to a third embodiment of the present disclosure will be described with reference to the drawing.

Figure 3:
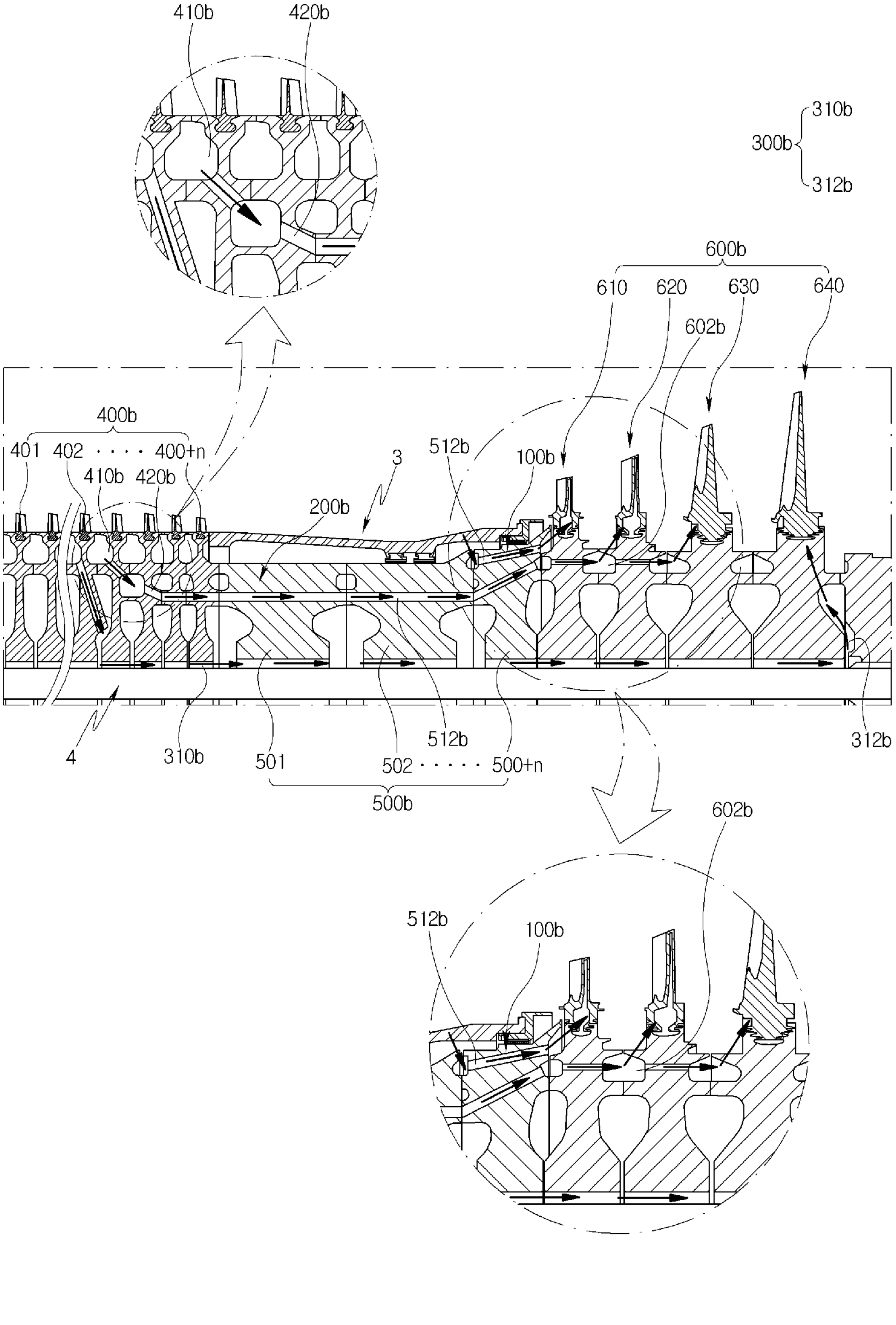
FIG. 3 is a longitudinal cross-sectional view illustrating a system for cooling a gas turbine according to a third embodiment of the present disclosure.

Referring to FIG. 3, the system for cooling a gas turbine according to the third embodiment of the present invention differs from the first or second embodiment in that the cooling air supplied through a second cooling air supply passage 200*b* is supplied to second and third stage turbine disks 620 and 630, and the cooling air supplied through a third cooling air supply passage 300*b* is supplied to a fourth stage turbine disk 640, so as to perform cooling.

To this end, the system for cooling a gas turbine according to the embodiment includes a first cooling air supply passage 100*b* which is provided in a gas turbine and is open such that cooling air is supplied from a compressor through torque tube cooling passages 512*b* formed in a combustor 3 and a torque tube unit 500*b* to a first stage turbine disk 610 of a turbine disk unit 600*b*, a second cooling air supply passage 200*b* which is open such that cooling air is supplied from an n-αth unit compressor disk of first to nth unit compressor disks 401 to 400+n, which constitute a compressor disk unit 400*b*, through the torque tube cooling passages 512*b* to second and third stage turbine disks 620 and 630 of the turbine disk unit 600*b*, and a third cooling air supply passage 300*b* which is open such that cooling air is supplied from the n-αth unit compressor disk of the first to nth unit compressor disks 401 to 400+n, after axially passing through a tie rod 4 provided in the gas turbine, to a fourth stage turbine disk 640 of the turbine disk unit 600*b*.

The first cooling air supply passage 100*b* according to the embodiment is open such that the cooling air supplied from the compressor is supplied to the first stage turbine disk 610 of the turbine disk unit 600*b* through the combustor 3 and the torque tube unit 500*b*. In addition, the first cooling air supply passage 100*b* has a path that is obliquely open toward the torque tube unit 500*b* from the rear end of the combustor 3, which is proximate to the first stage turbine disk 610, and then extends toward the first stage turbine disk 610.

When the first cooling air supply passage 100*b* extends by the above distance, the pressure and temperature of the cooling air supplied to the first stage turbine disk 610 may be stably maintained in an initial state without the reduction thereof. Therefore, it is possible to improve the cooling efficiency of the first stage turbine disk 610.

The first cooling air supply passage 100*b* is open in the state in which it is inclined downward toward the torque tube unit 500*b* from the outside of the combustor 3. Cooling air is supplied through the first cooling air supply passage 100*b* under high-temperature and high-pressure conditions.

Since a region where the first stage turbine disk 610 is positioned is maintained at a high temperature of about 1500° C. and at a high pressure, the pressure of the cooling air supplied through the first cooling air supply passage 100*b* is relatively higher than the pressure in the region where the first stage turbine disk 610 is positioned.

Through such a structure, it is possible to prevent cooling air from flowing backward toward the combustor 3 instead of the first stage turbine disk 610 when the pressure of the cooling air supplied through the first cooling air supply passage 100*b* is lower than the pressure in the region where the first stage turbine disk 610 is positioned.

Accordingly, it is possible to stably cool the first stage turbine disk 610, thereby improving cooling efficiency, and to minimize damage to and deformation of the first stage turbine disk 610.

The first cooling air supply passage 100*b* extends through the torque tube unit 500*b*, and the torque tube unit 500*b* includes first to nth unit torque tube units 501 to 500+n. The first cooling air supply passage 100*b* is formed in the n-αth unit torque tube unit.

Cooling air is supplied to the first stage turbine disk 610 in the state in which the flow of the cooling air is changed to a turbulent flow once again while the cooling air sequentially passes through the combustor 3 and second swirl chambers.

The second cooling air supply passage 200*b* is open such that cooling air is supplied from the tenth unit compressor disk of the first to nth unit compressor disks 401 to 400+n, which constitute the compressor disk unit 400*a*, through the torque tube unit 500*b* to the second and third stage turbine disks 620 and 630 of the turbine disk unit 600*b*.

The second cooling air supply passage 200*b* serves to mainly cool the second and third stage turbine disks 620 and 630. However, the entire layout of the second cooling air supply passage 200*b* is configured as follows.

That is, the second cooling air supply passage 200*b* has a movement path in which cooling air passes through the specific positions of the compressor disk unit 400*b*, the torque tube unit 500*b*, and the turbine disk unit 600*b*. Therefore, it is possible to cool a peripheral portion corresponding to the movement path while cooling the second stage turbine disk 620, thereby improving cooling efficiency, and to simultaneously perform the auxiliary cooling of the compressor disk unit 400*b* and the torque tube unit 500*b*.

The compressor disk unit 400*b* has first swirl chambers 410*b* which are formed beneath the first to nth unit compressor disks 401 to 400+n in order to change the flow of cooling air to a turbulent flow before the cooling air is supplied to the torque tube unit 500*b* after flowing into the compressor disk unit 400*b*.

The first swirl chambers 410*b* are empty spaces formed in the compressor disk unit in the longitudinal cross-sectional view illustrating the first to nth unit compressor disks 401 to 400+n, and each is not limited to having a specific size.

The first swirl chambers 410*b* serve to initially change the flow of cooling air to a turbulent flow when the cooling air flows along the second cooling air supply passage 200*b*. Therefore, it is possible to minimize a phenomenon in which the flow of cooling air is concentrated only on a specific region. In addition, since the first swirl chambers 410*b* provide movement capability that enables cooling air to move throughout the second cooling air supply passage 200*b*, it is possible to increase the cooling efficiency of the second stage turbine disk 620 which is a cooling object to be cooled.

Thus, it is possible to improve the cooling efficiency of the second stage turbine disk 620 which is exposed to a high-temperature condition for a long time.

The turbine disk unit 600*b* further includes third swirl chambers 602*b* in order to change the flow of cooling air to a turbulent flow. When cooling air is supplied to the second or third stage turbine disk 620 or 630, the third swirl chambers 602*b* serve to diffuse the flow of cooling air and may thus improve cooling efficiency.

The second cooling air supply passage 200*b* extends to the turbine disk unit 600*b* via the torque tube cooling passages 512*b* along the movement path through which the first swirl chambers 410*b* of the compressor disk unit 400*b* communicate with each other.

The third cooling air supply passage 300*b* is open such that cooling air is supplied to the fourth stage turbine disk 640 of the turbine disk unit 600*b* after axially passing through a tie rod 4 provided in the gas turbine.

The third cooling air supply passage 300*b* further includes an extension passage 310*b*, which obliquely extends toward the tie rod 4, inserted into the center of the gas turbine, from the compressor disk unit 400*b*, and then extends toward the turbine disk unit 600*b* along the outer peripheral surface of the tie rod 4. The extension passage 310*b* rectilinearly extends toward the turbine disk unit 600*b* in the axial direction of the tie rod 4.

By way of example, since cooling air is supplied to the third cooling air supply passage 300*b* from the ninth unit compressor disks and the extension passage 310*b* extends rectilinearly, the third cooling air supply passage 300*b* may have a simple passage structure, compared to the first and second cooling air supply passages 100*b* and 200*b*. Accordingly, cooling air may be stably supplied to the fourth stage turbine disk 640 through the third cooling air supply passage 300*b* and perform efficient cooling, thereby improving the efficiency of the gas turbine.

The third cooling air supply passage 300*b* includes a first branch passage 312*b* which is independently branched to the fourth stage turbine disk 640 from the extension passage 310*b*. The first branch passage 312*b* extends downward from the fourth stage turbine disk 640.

The first branch passage 312*b* is divided into a plurality of passages and extends to the fourth stage turbine disk 640 from the extension passage 310*b* in order to cool the fourth stage turbine disk 640.

As is apparent from the above description, in accordance with exemplary embodiments of the present invention, high-pressure cooling air is supplied to a turbine disk unit and cooling air having different pressures and temperatures is supplied from different positions depending on the position of a turbine disk. Therefore, it is possible to perform optimal cooling depending on the position of the turbine disk.

In accordance with exemplary embodiments of the present invention, since high-temperature and high-pressure air generated by a compressor is used as the cooling air for cooling, it is possible to enhance cooling efficiency without a separate device for cooling the turbine disk.

In accordance with exemplary embodiments of the present invention, a cooling air supply passage through which cooling air flows can be easily processed by drilling, and it is thus possible to improve processability.

While the present disclosure has been described with respect to the specific embodiments, it will be apparent to those skilled in the art that various changes and modifications may be made without departing from the spirit and scope of the disclosure.

The breadth and scope of the present disclosure should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A cooling system of a gas turbine including a compressor, a combustor and a turbine, comprising:

a compressor cooling air supply passage formed in an nth unit compressor disk of first to nth unit compressor disks, wherein the first to nth unit compressor disks are included in a compressor disk unit which is included in the compressor;

a first cooling air supply passage operable to supply cooling air from the compressor through the combustor and a torque tube unit to a first stage turbine disk of a turbine disk unit included in the turbine;

a second cooling air supply passage formed in, and by drilling, the torque tube unit such that the second cooling air supply passage has a rectilinear shape or a shape that is inclined at a predetermined angle, and operable to supply cooling air introduced from the compressor cooling air supply passage of the nth unit compressor disk, included in the compressor disk unit, through the torque tube unit to a second stage turbine disk of the turbine disk unit; and a third cooling air supply passage operable to supply cooling air from an n-αth unit compressor disk of the first to nth unit compressor disks, after axially passing through a tie rod of the gas turbine, to third and fourth stage turbine disks of the turbine disk unit, wherein the third cooling air supply passage includes:

a plurality of first branch passages that are independently branched to the third stage turbine disk from an extension passage; and a second branch passage that is independently branched to the fourth stage turbine disk from the extension passage.

2. The cooling system according to claim 1, wherein the first, second and third cooling air supply passages are arranged such that cooling air supplied through the first and second cooling air supply passages has a pressure and a temperature that are relatively higher than the cooling air supplied through the third cooling air supply passage.

3. The cooling system according to claim 1, wherein:

the nth unit compressor disk is a final unit compressor disk, which is proximate to the torque tube unit, among the first to nth unit compressor disks arranged toward the torque tube unit; and the n-αth unit compressor disk is a unit compressor disk that is located at an αth position from the nth unit compressor disk in a direction toward the first unit compressor disk.

4. The cooling system according to claim 1, wherein the first cooling air supply passage has a path that is obliquely open toward the torque tube unit from a rear end of the combustor, which is proximate to the first stage turbine disk, and then extends toward the first stage turbine disk.

5. The cooling system according to claim 1, wherein the compressor disk unit includes first swirl chambers disposed beneath the first to nth unit compressor disks and operable to change a flow of cooling air to a turbulent flow before the cooling air is supplied to the torque tube unit after flowing into the compressor disk unit.

6. The cooling system according to claim 2, wherein the first cooling air supply passage is operable to change a flow of the cooling air to a turbulent flow while the cooling air sequentially passes through the combustor and second swirl chambers formed in the torque tube unit and is supplied to the first stage turbine disk through first swirl chambers formed in the compressor disk unit before the cooling air is supplied to the first stage turbine disk.

7. The cooling system according to claim 6, wherein the compressor cooling air supply passage connects the first and second swirl chambers, the compressor cooling air supply passage being operable to move the cooling air therethrough.

8. The cooling system according to claim 1, wherein the first cooling air supply passage is operable to supply the cooling air to the first stage turbine disk through the first cooling air supply passage at a relatively higher pressure than that in the first stage turbine disk.

9. The cooling system according to claim 1, wherein:

the torque tube unit includes first to nth unit torque tube units arranged in contact with each other and disposed between the compressor disk unit and the turbine disk unit; and the first to nth unit torque tube units include torque tube cooling passages in communication with the first or second cooling air supply passage.

10. The cooling system according to claim 9, wherein the torque tube unit includes chambers defined by front and rear surfaces of adjacent unit torque tube units.

11. The cooling system according to claim 10, wherein the torque tube cooling passages extend toward the compressor disk unit through a region in which the chambers are not disposed.

12. The cooling system according to claim 1, wherein the third cooling air supply passage includes the extension passage that obliquely extends toward the tie rod from the compressor disk unit, and then extends toward the turbine disk unit along an outer peripheral surface of the tie rod, the tie rod being disposed at a center of the gas turbine.

13. The cooling system according to claim 1, wherein the turbine disk unit includes third swirl chambers operable to change a flow of cooling air to a turbulent flow.

* * * * *